United States Patent [19]

Chiang

[11] Patent Number: 5,332,614
[45] Date of Patent: Jul. 26, 1994

[54] ANGLED STRUCTURAL MEMBER WITH RECESSED THIN WALL FOR DRILLING OR KNOCK-OUT

[76] Inventor: Yung-Ching Chiang, No. 1-2, Lane 975, Chun-Jih Road, Tao-Yuan City, Taiwan

[21] Appl. No.: 26,734

[22] Filed: Mar. 5, 1993

[51] Int. Cl.5 .............................................. B32B 3/00
[52] U.S. Cl. .................................... 428/156; 428/134; 428/135; 428/167; 428/213
[58] Field of Search ............... 428/156, 167, 174, 118, 428/131, 134, 135, 192, 121, 155, 187, 195, 213

[56] References Cited

U.S. PATENT DOCUMENTS 4,869,969  9/1989  Pavlov et al. ........................ 428/572

Primary Examiner—Donald J. Loney
Attorney, Agent, or Firm—Morton J. Rosenberg; David I. Klein

[57] ABSTRACT

An improvement on an angled structural member comprises an elongated member with an "L-shape" cross section. The said member has a smooth face in the outer surface on one hand, and a plurality of recesses in the inner face on the other hand. Each of the recesses further includes a circular cavity which remains an integrated thin wall at one end of the cavity.

7 Claims, 6 Drawing Sheets

ANGLED STRUCTURAL MEMBER WITH RECESSED THIN WALL FOR DRILLING OR KNOCK-OUT

FIELD OF THE INVENTION

This invention relates in general to angled structural members. In particular, it relates to angled structural members with a plurality of hidden recesses.

In the prior art, angled structural members have been widely used to construct bookcases or display shelves. These angled structural members commonly have an "L"-shaped cross-section and are joined together by one of two prevalent means. As illustrated in FIG. 5, structural members 1a, 1a are either welded together along their adjoining edges 11, or fastened together by use of matching nut and bolt after a hole 12 is drilled through the mutually abutting faces of structural members 1a, 1a. Each alternative presents inconveniences. Welding requires the attention of a skilled technician while drilling a hole for a bolt requires careful, adept handling.

Another type of angled structural member 1b, as shown in FIG. 6, has been introduced into the prior art. This type of angled structural member also has an "L"-shaped cross-section, but has a plurality of holes 13 of varying sizes and shapes distributed over its faces. Two such structural members 1b, 1b can be fastened to one another by use of bolt 14 and matching nut 15 through their aligned holes. Assembly this way is quite convenient, but the plurality of unused holes 13 is aesthetically displeasing.

Another drawback in assembling the angled structural member 1a or 1b of FIGS. 5 and 6, respectively, with nut and bolt is that the assembler must hold the nut with one hand, while the other hand attempts to simultaneously hold in place the structural members and tighten the bolt. The result is a very awkward and inconvenient process.

SUMMARY OF THE INVENTION

The primary object of the subject invention is to provide an angled structural member which offers structural integrity and utility while remedying the aforementioned shortcomings.

The angled structural member of the subject invention comprises an elongated member with an "L"-shaped cross-section. This member has a smooth surface on its outer face and a plurality of recesses in the surface of its inner face. Mark lines defining a numerical scale are provided in the inner face to guide its alignment with another such member.

The angled structural member of the subject invention offers noticeable advantages over the prior art. It provides a plurality of selectable recesses on the inner face, the bases of which are easily broken through with simple tools. It also provides mark lines on the numerical scale of its inner face to guide a precise cut, if necessary, to customize its size. In addition, it provides hexagonal-shaped recesses on the inner face so that a hexagonal nut can be automatically secured in place while a matching bolt is screwed into it.

BRIEF DESCRIPTION OF THE DRAWINGS

The structural and operational characteristics of the present invention and its advantages as compared to the known state of the prior art will be better understood from the following description, relating to the attached drawings which show illustratively, but not restrictively, the angled structural member. In the Drawings.

DESCRIPTION OF THE PREFERRED EMBODIMENT

Figure 1:
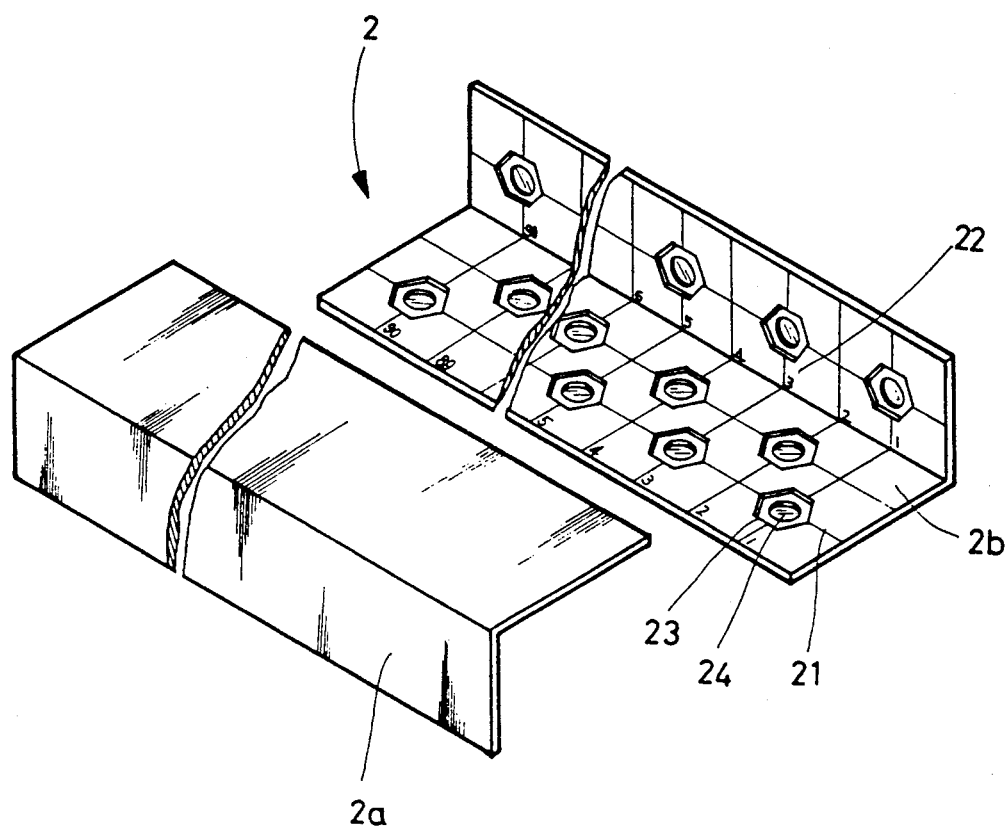
FIG. 1 shows a perspective view of a pair of angled structural members of the subject invention showing the outer and inner faces, respectively.

Referring to FIG. 1, the angled structural member 2 according to the subject invention may be composed of a metal or plastic material. The angled structural member 2 has a smooth surface on its outer surface 2a. This results in an aesthetically-pleasing appearance for an assembly of angled structural members 2. The inner face 2b of the angled structural member 2 has a plurality of mark lines 21 and scale members 22 which facilitate both the precise cutting of angled structural member 2 and the accurate selection of the appropriate hole to be knocked out. A plurality of hexagonal-shaped recesses 23 are formed in the inner face 2b, and a second recess 24 is formed within each recess 23. The existence of recesses 23 and circular cavities 24 in the inner face 2b is in no way apparent in the smooth outer face 2a.

Figure 2:
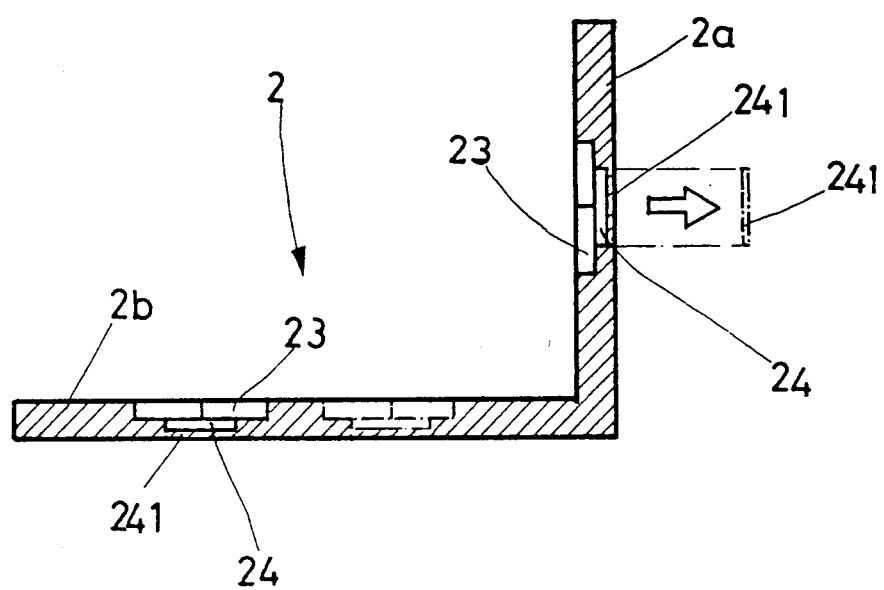
FIG. 2 is a cross-sectional view of the angled structural member of the subject invention.

As shown in the cross-sectional view of angled structural member 2 in FIG. 2, a thin base 241 underlies second recess 24. This thin base 241 can be easily knocked out with simple tools such as hammer and chisel.

Figure 3:
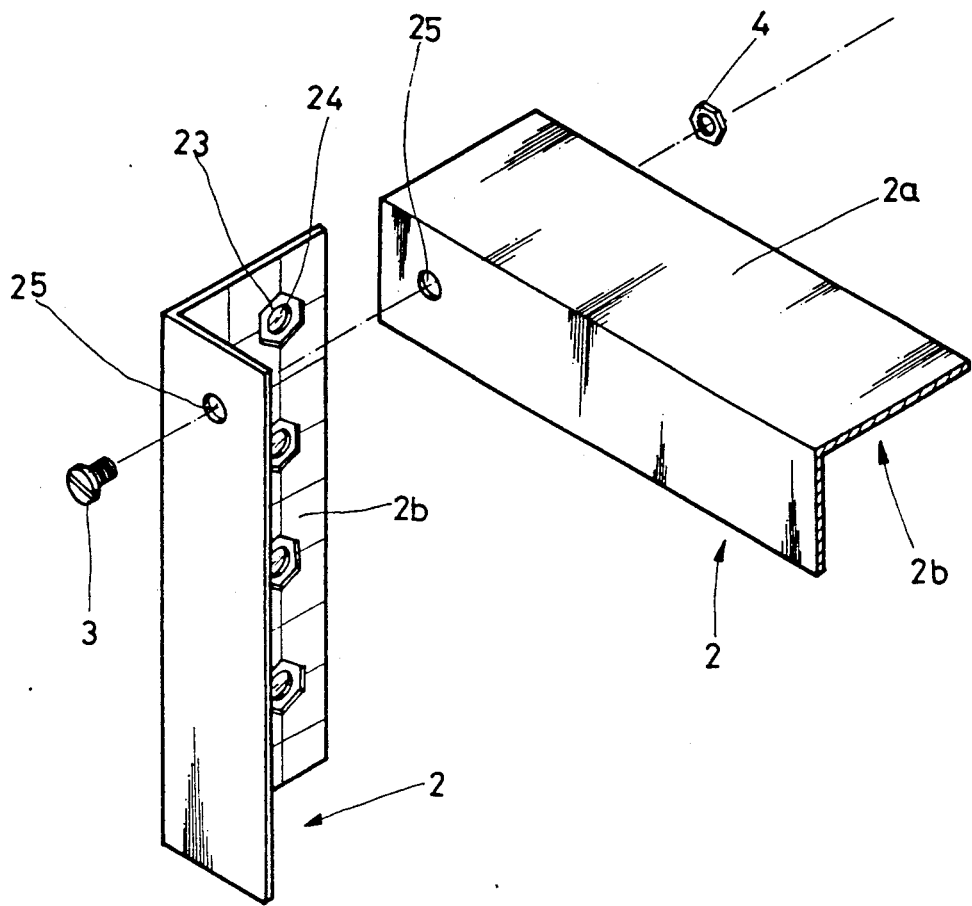
FIG. 3 is a perspective view of a pair of angled structural members of the subject invention in a typical arrangement for fastening with a bolt and matching nut.

As shown in FIG. 3, a hole 25 is formed when the thin base 241 of second recess 24 is knocked out. A bolt 3 can then be easily inserted into two aligned holes 25 of angled structural members 2; and a hexagonal nut 4 can be placed within the hexagonal recess 23 to mate with bolt 3. The hexagonal recess 23 will prevent said hexagonal nut 4 from rotating as bolt 3 is screwed in.

Figure 4:
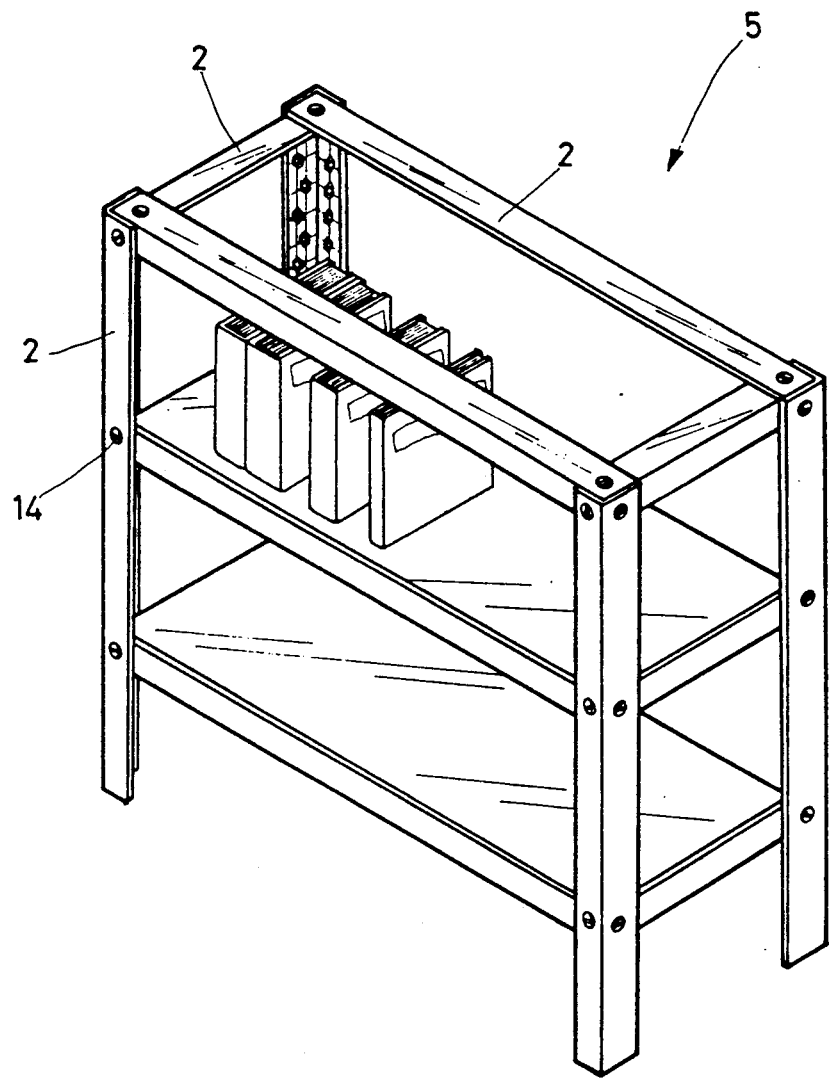
FIG. 4 is a perspective view of a bookcase constructed by assembling a plurality of angled structural members of the subject invention.
Figure 5:
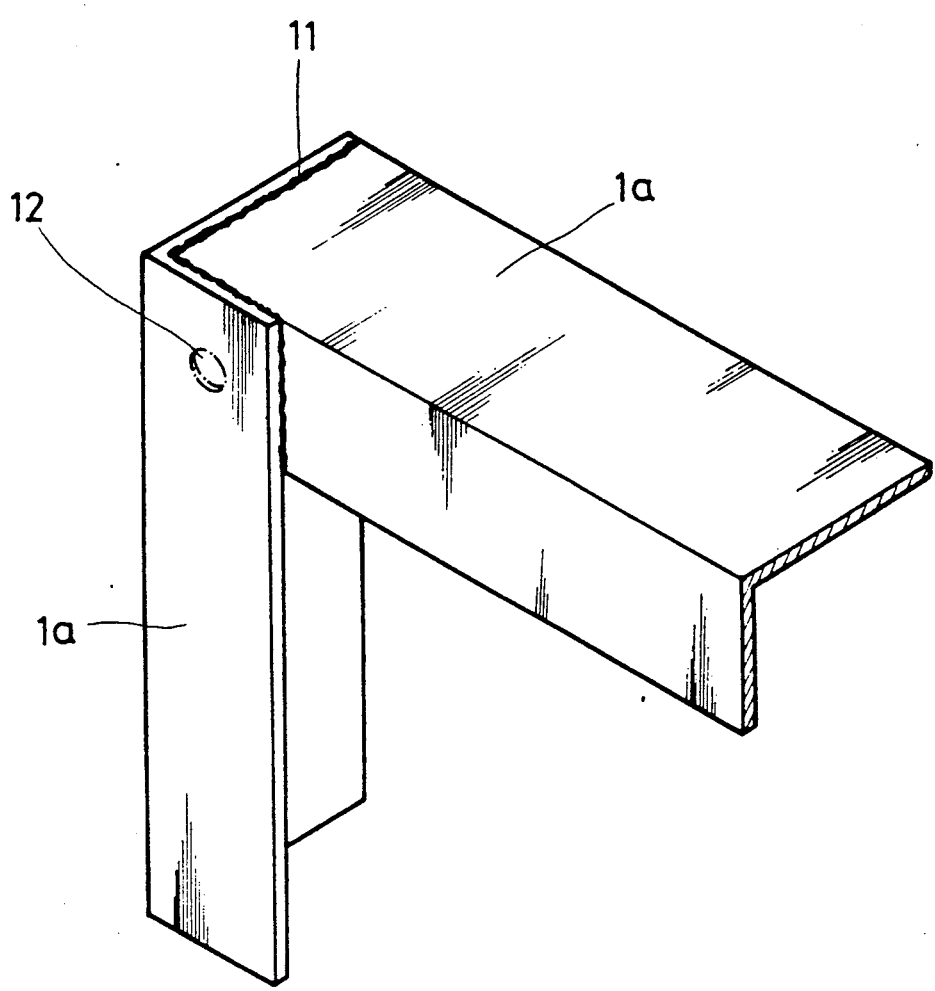
FIG. 5 is a perspective view of two prior art angled structural members joined together by welding along its contacting edges; and, FIG. 6 is also a perspective view of two angled structural members in a typical arrangement for fastening with a bolt and matching nut.
Figure 6:
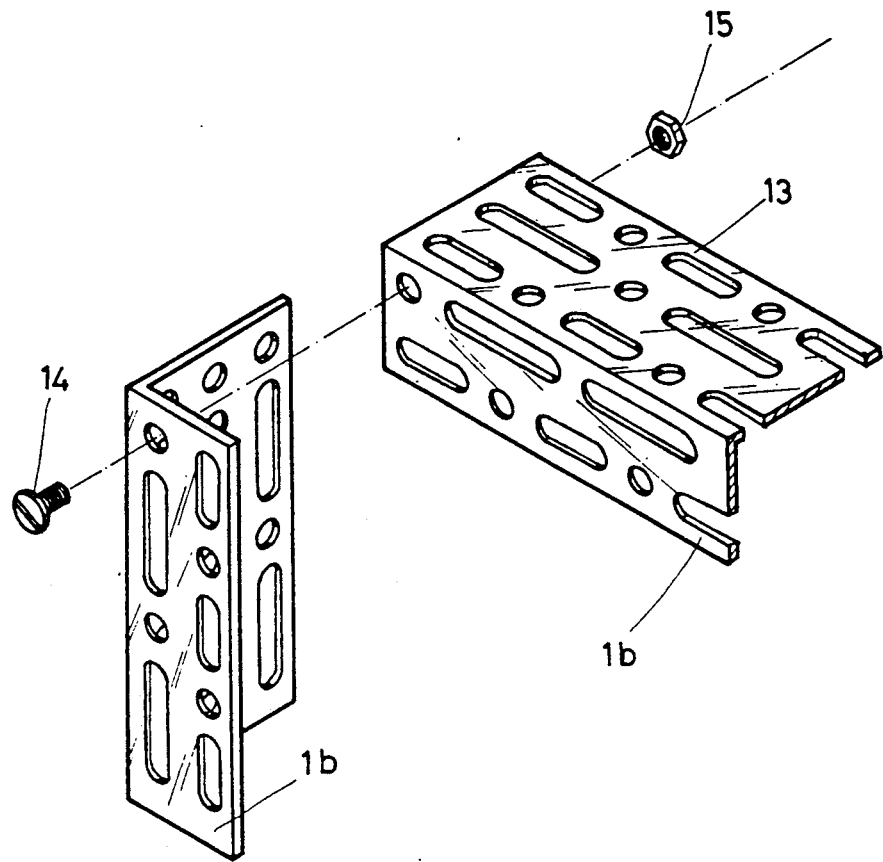

As shown in FIG. 4, a bookcase can be constructed by assembling a plurality of angled structural members 2. These angled structural members 2 can be cut into predetermined lengths along the mark lines 21 and scales 22 to accommodate various sizes and shapes of the assembly.

The advantages offered by the subject invention can be summarized as follows:

1. A hole can be easily formed in the angled structural member since only thin base 241 which can be easily knocked out using simple tools underlies second recess 24. Any person of ordinary skill can, therefore, use the angled structural members to assemble a structure.

2. The appropriately-positioned hole can be accurately selected for knock-out since interface 2b is provided with mark lines 21 and scale members 22. The length of the member 2 can be accurately customized by following the guidance of mark lines 21.

3. Convenient assembly is made possible by the existence of hexagonal-shaped recesses 23 formed into the interface 2b of the angled structural member, since the recesses 23 hold nut 4 in place while bolt 3 is screwed into it.

Although the present invention has been described in connection with the preferred embodiment thereof, many other variations and modifications will now become apparent to those skilled in the art without departing from the scope of the invention. It is preferred, therefore, that the present invention not be limited by the specific disclosure herein, but only by the appended claims.

I claim:

1. A structural member extending in a longitudinal direction having a substantially L-shaped cross-sectional contour forming a pair of substantially orthogonally directed leg members, each of said leg members having opposing sides forming an inner surface and an outer surface defining a thickness dimension of said leg members, each of said leg outer surfaces forming a planar contour and each of said inner surfaces having formed therethrough a plurality of blind openings defined by a plurality of first recesses having a first opening recess dimension and a plurality of second recesses aligned with respective ones of said first recesses and having a second opening recess dimension less than said first opening recess dimension, each of said first and second recesses in combination having a thickness dimension less than said thickness dimension of said leg members.

2. The structural member as recited in claim 1 where each of said first recess opening dimensions define a predetermined polygonal contour for mating insert therein of a fastening nut substantially having said predetermined polygonal contour for mounting said fastening nut within said first recess and preventing rotation of said fastening nut therein.

3. The structural member as recited in claim 2 where said predetermined polygonal contour is a hexagonal contour.

4. The structural member as recited in claim 1 where each of said second recesses define a base section adapted to be removed by impact thereon of an impact member.

5. The structural member as recited in claim 1 including indicia formed on said leg inner surface forming a plurality of spaced apart marking line indicia for (1) aligning one of said structural members to another of said structural member, and, (2) providing a longitudinal measure of said structural member.

6. The structural member as recited in claim 5 where said plurality of spaced apart marking line indicia form a plurality of mutually orthogonal and intersecting marking lines inscribed within a respective leg inner surface.

7. The structural member as recited in claim 5 where said plurality of said spaced apart marking line indicia includes a plurality of numerical scale indicia for labeling said spaced apart marking line indicia.

* * * * *